United States Patent
Martinez (10) Patent No.: US 9,420,742 B2
(45) Date of Patent: Aug. 23, 2016

(54) REAPING MACHINE WITH KEYED ANTI-ROTATION DEVICE FOR BLADE MOUNTING PIN

(71) Applicant: DEERE & COMPANY, Moline, IL (US)

(72) Inventor: Hector Geraldo Martinez, Guadalupe (MX)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/600,215

(22) Filed: Jan. 20, 2015

(65) Prior Publication Data

US 2015/0208578 A1  Jul. 30, 2015

(30) Foreign Application Priority Data

Jan. 28, 2014  (DE) .................. 10 2014 201 519

(51) Int. Cl.
*A01D 34/52*  (2006.01)
*A01D 34/73*  (2006.01)

(52) U.S. Cl.
CPC ................... *A01D 34/733* (2013.01)

(58) Field of Classification Search
CPC .... A01D 34/733; A01D 34/30; A01D 34/52; A01D 34/736; A01D 34/73; A01D 34/866; A01G 3/062; Y10T 29/49721; Y10T 29/4973; Y10T 29/49815
USPC ............ 56/295, 255; 29/402.03, 426.1, 428; 403/344
See application file for complete search history.

(56) References Cited

U.S. PATENT DOCUMENTS

| | | | | |
|---|---|---|---|---|
| 2,592,755 A * | 4/1952 | Soenksen | ............. | A01D 34/733 56/295 |
| 3,507,104 A * | 4/1970 | Kline | ................... | A01D 34/733 56/12.7 |
| 4,067,179 A * | 1/1978 | Schneider | ............. | A01D 34/30 56/297 |
| 4,525,990 A * | 7/1985 | Zweegers | ............. | A01D 34/733 56/13.6 |
| 4,815,264 A * | 3/1989 | Mijnders | .............. | A01D 34/736 D34/736 |
| 5,438,819 A * | 8/1995 | Dallman | ................ | A01D 34/73 56/17.5 |
| 6,055,798 A * | 5/2000 | Fulmer | ................ | A01D 34/733 403/344 |
| 6,357,215 B1 * | 3/2002 | Thorne | .................. | A01G 3/062 56/255 |
| 7,703,267 B2 * | 4/2010 | Tapper | ................. | A01D 34/733 56/255 |
| 2002/0194829 A1 * | 12/2002 | Petersen | ............. | A01D 34/733 56/255 |
| 2004/0177484 A1 * | 9/2004 | Thompson | ........... | A01D 37/733 29/402.03 |
| 2005/0138913 A1 * | 6/2005 | Thompson | ........... | A01D 34/733 56/295 |
| 2005/0193706 A1 * | 9/2005 | Thompson | ........... | A01D 34/733 56/255 |
| 2010/0101201 A1 * | 4/2010 | Yanke | .................. | A01D 34/733 56/295 |

FOREIGN PATENT DOCUMENTS

WO  WO 9014755 A  * 12/1990 ............. A01D 34/73

* cited by examiner

*Primary Examiner* — Árpád Fábián-Kovács
(74) *Attorney, Agent, or Firm* — Ingrassia, Fisher & Lorenz PC (57) ABSTRACT

A reaping machine includes a sickle bar that can rotate and at least one reaping blade arranged on the sickle bar. The reaping blade is supported so that it can pivot on a pin fastened to the sickle bar. The pin has a fastening section for fastening to the sickle bar and a holding section separated by a shoulder from the fastening section for holding the reaping blade so that it can pivot. To simplify the placement or installation of the pin on the sickle bar, at least one raised section extending in the radial direction past a circumferential segment of the pin is formed in the fastening section of the pin.

8 Claims, 8 Drawing Sheets

REAPING MACHINE WITH KEYED ANTI-ROTATION DEVICE FOR BLADE MOUNTING PIN

CROSS-REFERENCE TO RELATED APPLICATIONS

Pursuant to 35 USC §119, this application claims the benefit of and priority to German patent application no. 102014201519.7, filed on Jan. 28, 2014, which is herein incorporated by reference in its entirety.

FIELD OF THE DISCLOSURE

The invention relates to a reaping machine with a sickle bar that can rotate, at least one reaping blade arranged on the sickle bar, wherein the reaping blade is supported so that it can pivot on a pin fastened on the sickle bar, wherein the pin has a fastening section for fastening to the sickle bar and a holding section separated by a shoulder from the fastening section for holding the reaping blade so that it can pivot.

BACKGROUND

Reaping machines with a rotating sickle bar, on whose ends reaping blades are attached so that they can pivot, are known in the prior art and are used in the agricultural industry for reaping grass or other stalk-like crop. The reaping blades are supported so that they can pivot by means of a holding pin such that the reaping blades can be oriented radial to the rotational axis of the sickle bar by centrifugal forces generated during the rotation of the sickle bar. The holding pins are provided with a shoulder for the pivoting support of the reaping blade and have a fastening shaft that is provided with a thread and can be connected or screwed to the sickle bar. For this purpose, the holding pins are guided through a fastening hole on the end of the sickle bar and connected to the sickle bar by means of a threaded nut. To be able to withstand the stresses during reaping and to prevent detachment of the threaded connections due to vibration and pin rotation, the holding pins must be fastened with a correspondingly high tightening torque for the threaded nut. This requires special tools, in particular a torque wrench or the like, and a corresponding expense of energy. If the reaping blade must be replaced due to use and wear or in the event of damage to the reaping blade, it is often necessary to replace or exchange the blade on site or in the field. Thus, the wish of every user is to keep the mentioned maintenance expense low, to reduce the expenditure of force necessary for replacing the reaping blade, and, in particular, to not require the use of special tools.

SUMMARY

The problem forming the basis of the invention is to disclose a reaping machine of the type named above through which the previously mentioned disadvantages are overcome.

The problem is solved according to the invention by the teaching of claim 1. Other advantageous constructions and refinements of the invention are described in the dependent claims.

According to the invention, a reaping machine of the type named above is formed such that, in the fastening section of the pin, at least one raised section is formed extending radially and past a circumferential segment of the pin, furthermore, on at least one end of the sickle bar, an opening is formed that has a shape essentially corresponding to the cross section of the pin (cross section through the pin perpendicular to the longitudinal axis of the pin) in the area of the raised section such that the pin can be guided axially in an insertion position with the raised section oriented relative to the opening and can be fixed in the axial direction in a fixed position with the raised section not oriented relative to the opening after being passed through the opening, and furthermore, an anti-rotation device is provided for the pin such that the pin can be rotatably fixed in its fixed position. The raised section on the pin can extend both on one side, on two sides, or on several sides radially past the pin circumference and forms a kind of key bit that can be inserted only in a certain insertion position, namely in a position oriented relative to the corresponding opening. The opening forms a kind of keyhole. The pin is preferably cylindrical and has a rotationally symmetric design up to the area of the raised section. After the pin has been guided through the opening, it can be moved into the fixed position by rotating it about its rotational axis, so that the pin forms a contact with its raised section on one side and its shoulder on the other side of the sickle bar. This creates an axial locking of the pin on the sickle bar. The additional anti-rotation device prevents rotation of the pin relative to the sickle bar. The holding section on the pin is formed by the shoulder and by another projection on the end of the pin, in the shape of a pin head, so that the reaping blade is supported so that it can pivot between the shoulder and the additional projection. The axial forces acting on the pin due to the reaping blade when the reaping machine is in operation are completely received by the radial raised section on the pin and also by the shoulder, so that only the anti-rotation device for the pin must be secured by the threaded connection. Here, a minimum tightening torque in the threaded connection of the pin with the threaded nut is sufficient to mount the pin on the sickle bar.

The anti-rotation device can comprise a plate in which an opening is similarly formed that has a shape essentially corresponding to the cross section of the pin in the area of the raised section, wherein the plate can be placed on the pin positioned in the fixed position in a position oriented with the opening relative to the raised section on the pin and can be fastened locked in rotation on the pin or on the sickle bar. Because the plate has an opening corresponding to the raised section of the pin and can be brought into engagement with the raised section, the pin can no longer be rotated relative to the plate. A fastening of the plate on the pin or on the sickle bar in engagement with the raised section thus simultaneously forms an anti-rotation device of the pin relative to the plate.

Furthermore, the anti-rotation device can comprise a fixing element in the form of a U-profile, wherein the fixing element comprises a hole with which it can be placed on the pin and on the plate, and furthermore, the fixing element can be fastened on the pin by means of a threaded nut and a thread formed on the pin, wherein the fixing element comprises legs laterally enclosing the sickle bar and the plate in the area of the openings, with this arrangement securing the plate against rotation. Because the U-profile can be placed on the plate and here projects with its legs past the edges of the sickle bar, the plate is secured against rotation on the sickle bar. In this way, the pin is also secured against rotation relative to the sickle bar or relative to the opening on the sickle bar. Other solutions for an anti-rotation device for the plate could also be used, for example, an L-profile with only one leg projecting past the edge of the sickle bar. The significant feature here is that the fixing element is secured against rotation by its geometric shape on the sickle bar, so that rotational forces acting on the plate and on the fixing element are received on the sickle bar by the supporting effects generated by the geometric shape of the plate in connection with the fixing element and not by the threaded connection provided on the pin. Therefore, minimal tightening torques on the threaded nut are sufficient for securing the pin on the sickle bar, because only the anti-rotation device must be held axially on the sickle bar or on the pin.

In another construction of the invention, it is provided that the anti-rotation device has a U-profile in which an opening is similarly formed that has a shape essentially corresponding to the cross section of the pin in the area of the raised section, wherein the U-profile can be placed on the pin positioned in the fixed position in a position oriented with the opening relative to the raised section on the pin and can be fastened on the pin by means of a threaded nut and a thread formed on the pin, wherein the U-profile comprises legs laterally enclosing the sickle bar in the area of the openings, with this arrangement securing the pin against rotation. In this construction, a plate as part of the anti-rotation device is eliminated and the pin is secured against rotation directly by a U-profile, in that the U-profile itself has the corresponding opening and fixes the pin itself locked in rotation by means of this arrangement. By means of the legs of the U-profile that project in the same way as described above past the edges of the sickle bar, the U-profile itself is secured against rotation by a positive-locking connection with the sickle bar. Thus, the pin is also secured against rotation relative to the sickle bar or relative to the opening on the sickle bar. As described above, other solutions for the anti-rotation device for the pin could also be used, for example, an L-profile with only one leg projecting past the edge of the sickle bar. The significant feature here is also that the profile is secured against rotation by its geometric shape on the sickle bar, so that twisting forces (rotational forces) acting on the profile are received on the sickle bar by supporting effects generated by the geometric shape of the profile and not by the threaded connection provided on the pin. Therefore, minimum tightening torques on the threaded connection are sufficient for securing the pin on the sickle bar, because only the anti-rotation device must be held axially on the sickle bar or on the pin.

With reference to the drawings that show an embodiment of the invention, the invention as well as other advantages and advantageous refinements and constructions of the invention will be described and explained in more detail below.

BRIEF DESCRIPTION OF THE DRAWINGS

Shown are.

DETAILED DESCRIPTION

Figure 1:
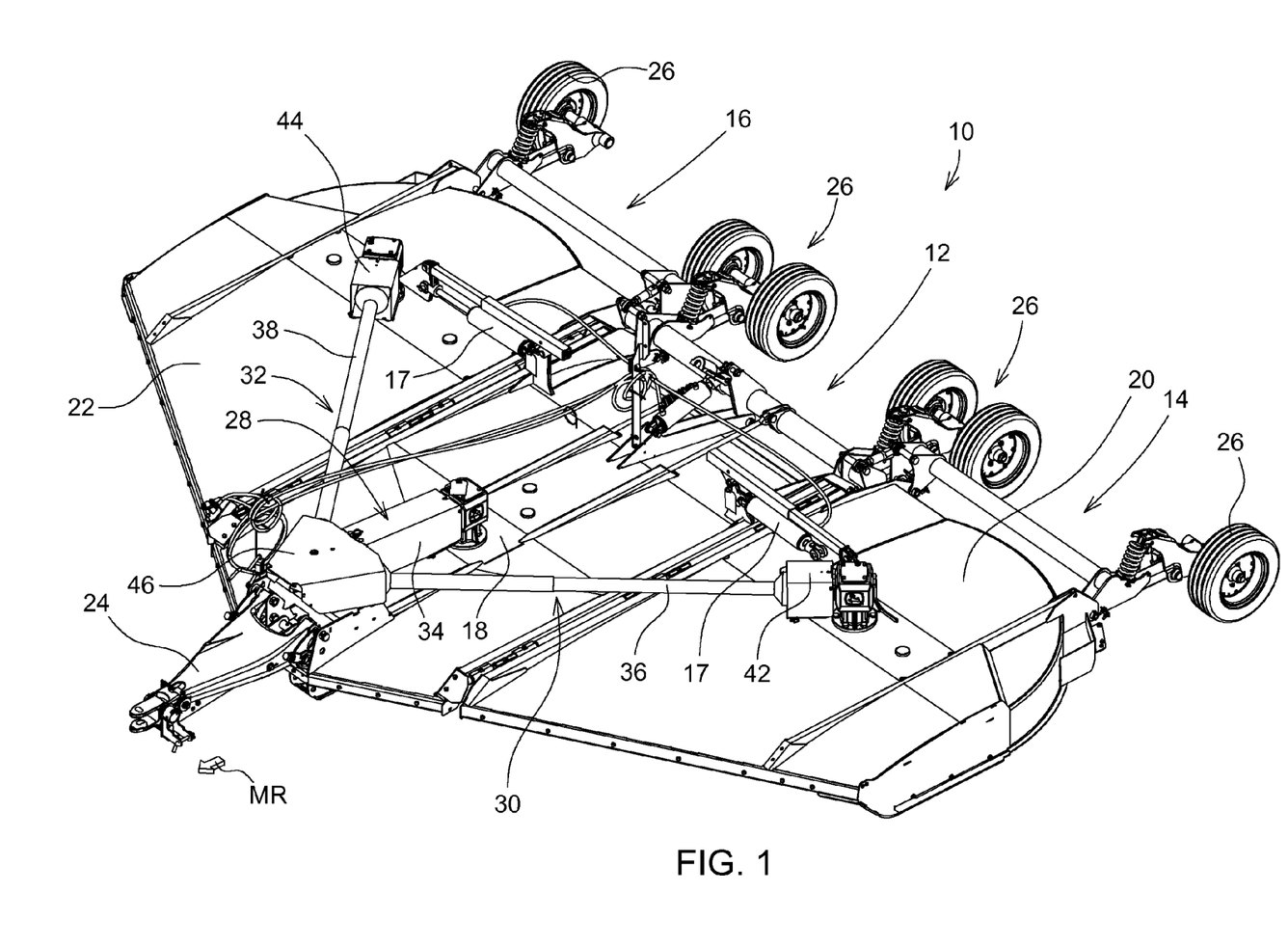
FIG. 1 a perspective top view of a reaping machine.

FIG. 1 shows a reaping machine 10 for attachment to an agricultural tractor (not shown). The reaping machine 10 comprises a middle reaping tool 12 that attaches, at its two sides, to side reaping tools 14, 16. The side reaping tools 14, 16 are formed as wing constructions and arranged so that they can pivot on the middle reaping tool 12, so that they can be moved or folded upward from an operating position for reaping into a transport position for transporting and back down again with the use of actuators 17 or motors, for example, hydraulic cylinders. Each of the reaping tools 12, 14, 16 comprises a reaping construction 18, 20, 22. The reaping tool 14 set in FIG. 1 on the left when viewed from above in the reaping direction MR or the corresponding reaping construction 20 set on the left will be considered in more detail below with reference to the drawing in FIG. 2.

The middle reaping construction 18 is equipped with a drawbar 24 that can be connected to a drawbar coupling (not shown) of the tractor and by means of which the reaping machine 10 is supported on the tractor on its front side. On the rear end of the reaping machine 10 there are wheels 26 on the individual reaping tools 12, 14, 16, and the reaping machine 10 is guided over the ground with the use of these wheels.

Each reaping tool 12, 14, 16 comprises its own drive train 28, 30, 32, each with a driveshaft 34, 36, 38 and angular transmission gearing 40, 42, 44. The drive shafts 34, 36, 38 open together in a branching transmission gearing 46 that can be driven by a power take-off shaft (not shown) of the tractor.

Figure 2:
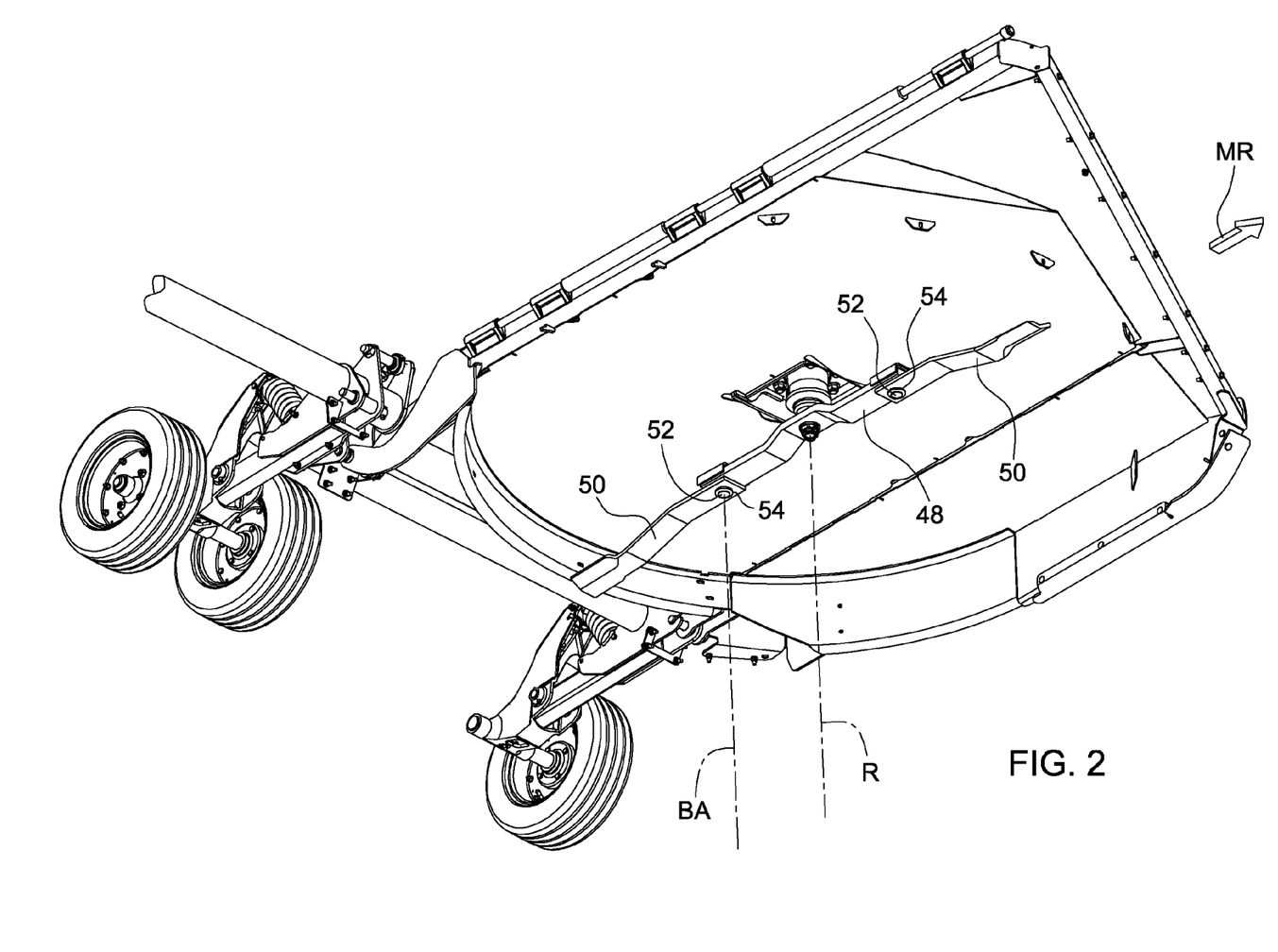
FIG. 2 a perspective bottom view of a side reaping tool of the reaping machine from FIG. 1 with a rotary-operated sickle bar and reaping blades supported on this bar so that they can pivot, FIG. 3 a first perspective exploded view for the support of one of the reaping blades with a pin on the sickle bar from FIG. 2, FIG. 4 a second perspective exploded view for the support of one of the reaping blades with a pin on the sickle bar from FIG. 2, FIG. 5 a third perspective exploded view for the support of one of the reaping blades with a pin on the sickle bar from FIG. 2, FIG. 6 a fourth perspective exploded view for the support of one of the reaping blades with a pin on the sickle bar from FIG. 2, FIG. 7 a first perspective exploded view for the support of one of the reaping blades with a pin on the sickle bar from FIG. 2 in an alternative construction, and FIG. 8 a second perspective exploded view for the support of one of the reaping blades with a pin on the sickle bar from FIG. 2 in the alternative construction according to FIG. 7.
Figure 3:
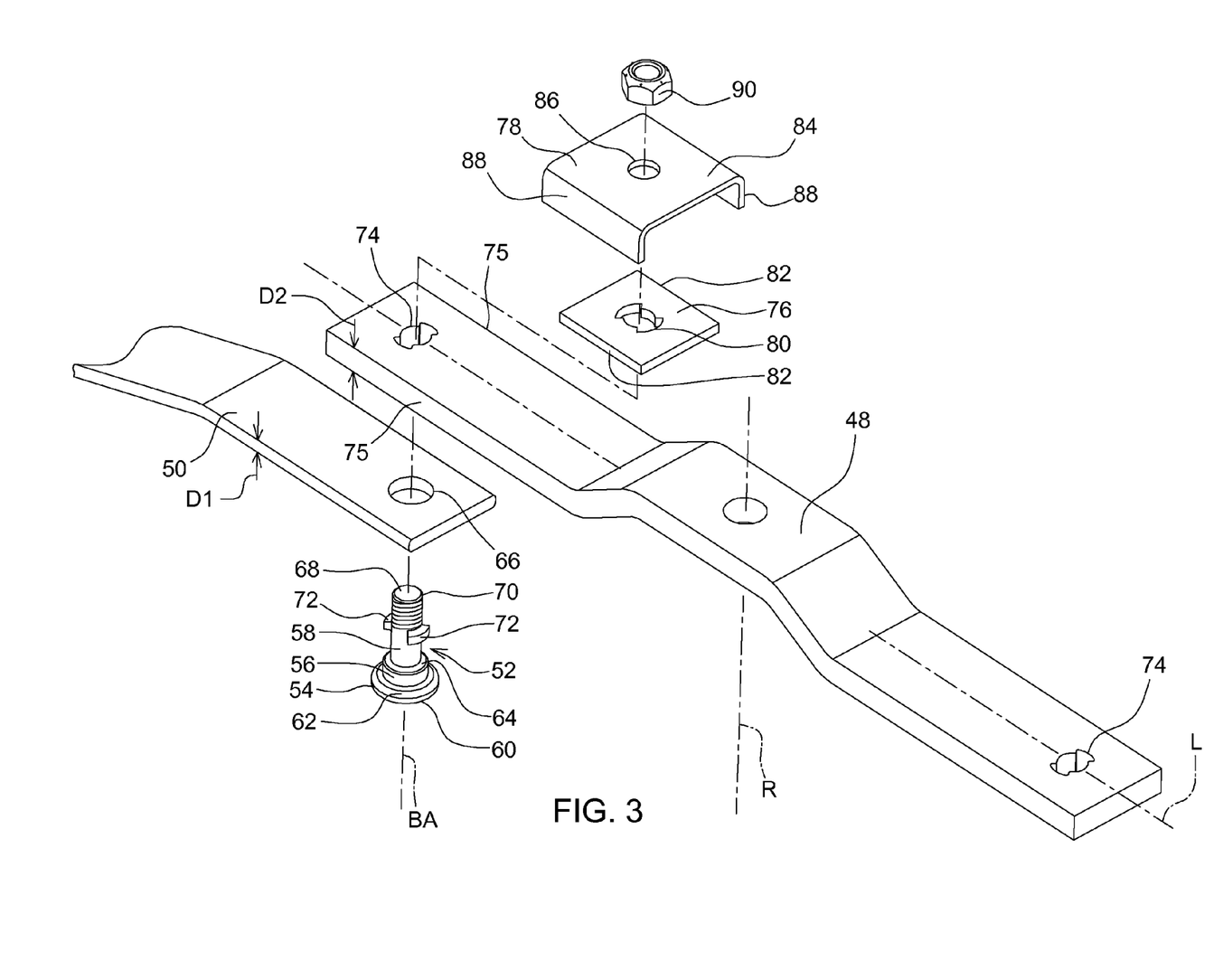
Figure 4:
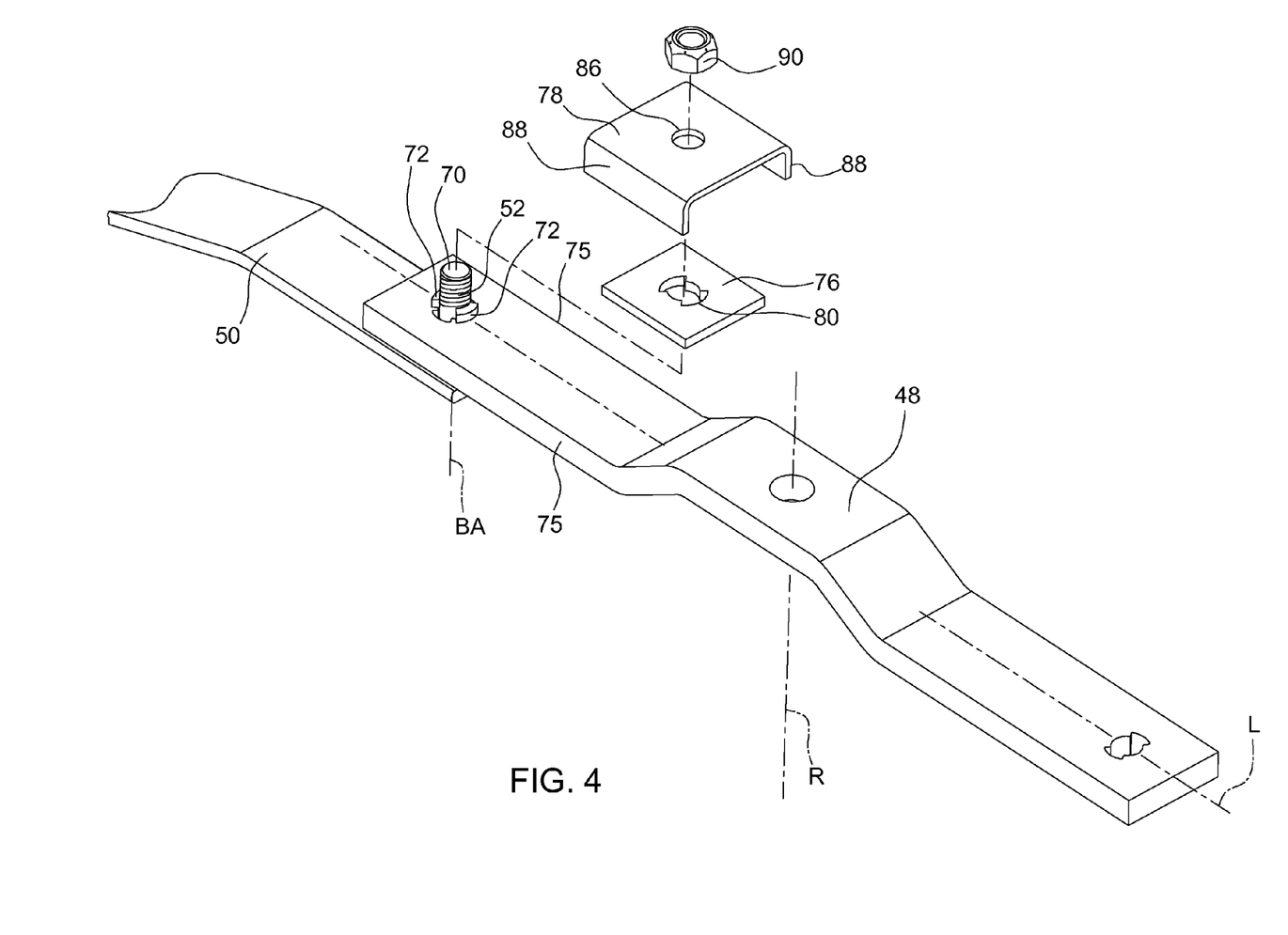
Figure 5:
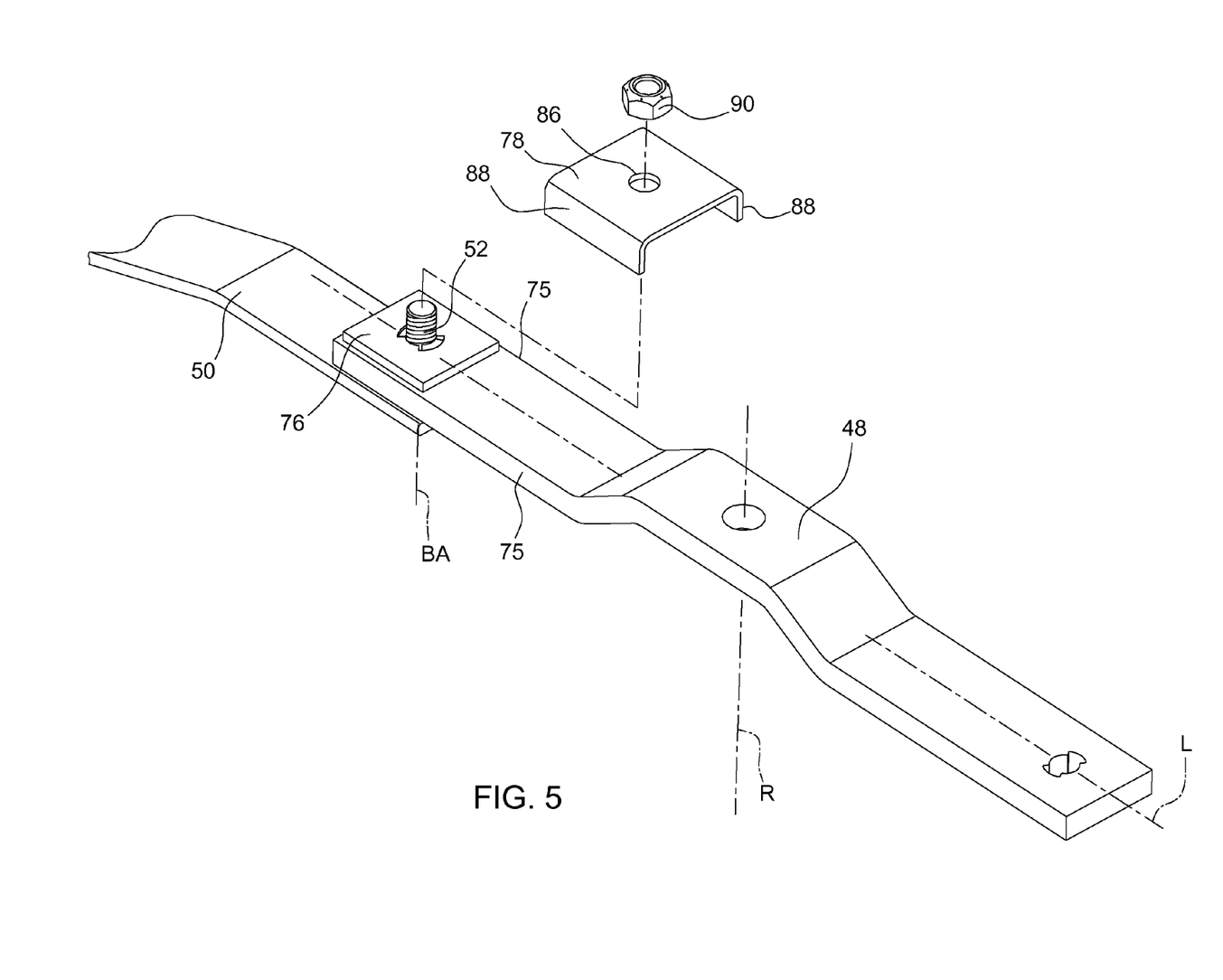
Figure 6:
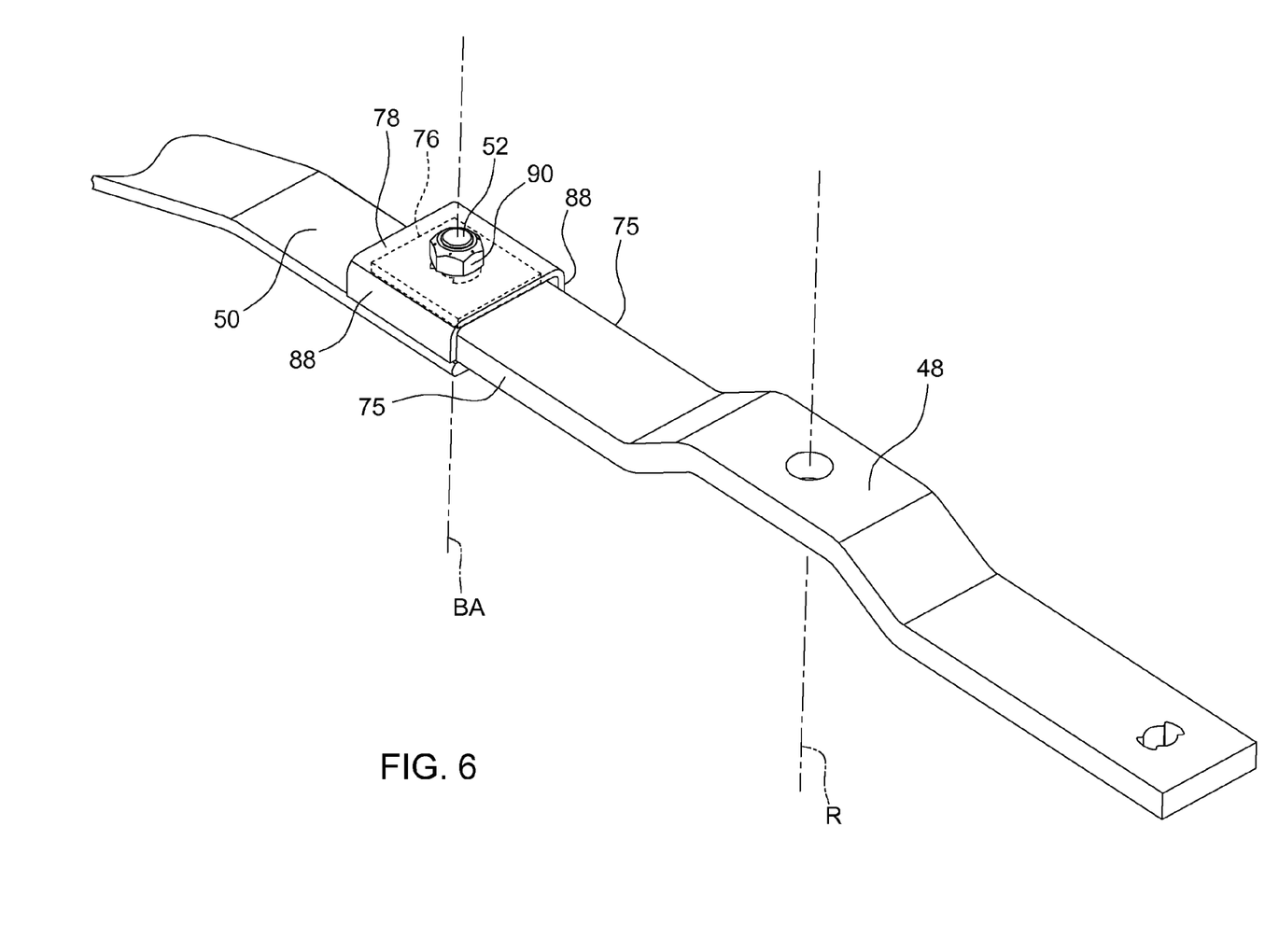

By means of each angular gear 40, 42, 44, the sickle bar 48 located underneath the individual reaping constructions 18, 20, 22 is driven to rotate about a rotational axis R, see FIG. 2, wherein the rotational axis R extends through the middle of the sickle bar 48, and on both sides of the sickle bar 48, on its outer ends, reaping blades 50 are supported so that they can pivot on the pin 52 about a pin axis BA. The reaping blades 50 are oriented outward in the radial direction due to the effect of centrifugal force while the sickle bar 48 is rotating.

The pin 52, as well as their arrangement on the sickle bar 48, and also the arrangement of the reaping blade 50 on its pin 52 or on the sickle bar 48, are shown in detail in FIGS. 2-8. The pin 52 is constructed as a cylindrical pin 52 and has a pin head 54, a holding section 56, and a fastening section 58. The pin head 54 is formed by a first end 60 of the pin 52 and by a projection 62 extending inward radially toward the pin axis BA. Starting from the projection 62, the holding section 56 extends axially toward the pin axis BA, with this section being bounded by a shoulder 64 extending radially inward, wherein the distance between projection 62 and shoulder 64 corresponds approximately to the material thickness D1 of the reaping blade 50 in the area of a cylindrical support hole 66 formed on the reaping blade 50. The diameter of the support hole 66 here essentially corresponds to the diameter of the pin 52 in the area of the holding section 56. The fastening section 58 extends starting from the shoulder 64 up to the second end 68 of the pin 52 lying opposite the first end 60. The fastening section 58 has, on the side to the second end 68, a screw thread 70. At a certain distance to the shoulder 64, in the axial direction to the pin axis BA toward the second end 68, raised sections 72 extending radially to the pin axis BA are formed on the fastening section 58, with these raised section being formed past a certain area of the circumference of the pin 52. The mentioned distance between the shoulder 64 and the raised sections 72 here essentially corresponds to the material thickness D2 of the sickle bar 48 on its ends, on which openings 74 are formed for fastening the pin 52. The raised sections on the pin 52 represent a kind of key bit and extend in this embodiment in the radial direction on both sides of the pin axis BA to opposing circumferential sections of the pin 52. Along the mentioned circumferential sections they form a ring segment that rises in the radial direction from the fastening section 58. A cross-sectional shape in the area of the raised sections 72 represents a kind of key bit that is reproduced in the form of the openings 74, in other words, the openings have a shape corresponding to the cross section of the pin 52 in the area of the raised section 72. In this example, two opposing ring segments are formed, but it is also conceivable to provide only one raised section on one side or also more than only two sections. The openings 74 at the ends of the sickle bar 48 are oriented, for example, so that shaped areas of the openings 74 reflecting the cross section of the raised sections 72 point to a longitudinal side 75 of the sickle bar 48, that is, extend 90° relative to a longitudinal axis L of the sickle bar 48. However, this is not absolutely required, because any other alignment of the openings 74 could also fulfill the purpose. The pin 52 and the openings 74 are coordinated with each other so that the pin 52 can only be inserted in a position oriented to an opening 74 with its raised sections 72 in the opening 74.

Furthermore, for each pin connection there is an anti-rotation device for the pin 52 in the form of a plate 76 in connection with a U-profile 78. The plate 76 has a plate opening 80 that is essentially equal in shape to the opening 74, wherein the plate 76 is oriented so that the shaped areas of the opening 80 reflecting the cross section of the raised sections 72 point in the direction of the longitudinal axis L of the sickle bar 48, thus the plate opening 80 is offset 90° relative to the openings 74. The plate 76 is dimensioned such that sides 82 of the plate 76 extending in the direction of the longitudinal axis L align with and end flush with the longitudinal sides 75 of the sickle bar. The U-profile 78 has, on a top side 84, a cylindrical hole 86 whose diameter essentially corresponds to the diameter of the pin 50 in the fastening section 58. Furthermore, on the U-profile 78, two side legs 88 extend that are oriented starting from the top side 84 of the U-profile 78 in the direction of the plate 76 and are dimensioned such that, when the plate 76 is on the sickle bar 48, both the sides 82 of the plate 76 and also an area of the longitudinal sides 75 of the sickle bar 48 are enclosed with a positive fit by the side legs 88, so that the U-profile 78 is secured against rotation in an arrangement set on the sickle bar 48, because the side legs 88 are supported on the longitudinal sides 75 of the sickle bar 48. The plate 76 is enclosed on the top side and laterally by the U-profile 78 and is here similarly secured against rotation. To secure the U-profile 78, a threaded nut 90 is provided that is screwed with the screw thread 70 formed on the pin 52.

The arrangement or installation of the pin 52 and the reaping blade 50 on the sickle bar 48 is realized as follows: The reaping blade 50 is pushed with its support hole 66 onto the holding section 56 on the pin 52. The pin 52 is oriented with the raised sections 72 formed on the pin 52 relative to the corresponding formations on the opening 74 and guided on the bottom side of the sickle bar 48, that is, on a side of the sickle bar facing the ground (from below in the FIGS. 3-8), through the opening 74 on the sickle bar 48. Then the pin is rotated by 90°. The raised sections 72 now project past the edge of the opening 74 such that the raised sections 72 are located at least partially above the opening 74 on the top side of the sickle bar 48 (on a side of the sickle bar 48 facing away from the ground or from below in FIGS. 3-8), wherein the pin 52 is axially fixed or assumes an axially fixed position. In the shown embodiment, the raised sections 72 are oriented in the direction of the longitudinal axis L. To also now fix the pin in this position locked in rotation, the plate 76 is guided with the plate opening 80 onto the pin 52 until this comes in contact on the top side on the sickle bar 48. Here, the pin 52 is surrounded in the area of the raised sections 72 by the plate 78 with its plate opening 80 arranged offset relative to the opening 74 by 90° with a positive fit. The U-profile 78 is now guided with its hole 86 likewise by means of the pin 52 until it contacts the plate 76 and surrounds, with its side legs 88, the plate 76 on the sides 82 and also the sickle bar on the sides 75. The plate 76 is secured against rotation by the side legs 88 that can be supported on the sides 75 of the sickle bar 48. The plate opening 80 engaged with a positive fit with the raised sections 72 on the pin 52 secures, in turn, the pin 52 against rotation. By means of the threaded nut 90, the U-profile 78 is screwed with the pin 52 and secured axially. The axial forces acting on the pin 52 are received by the raised sections 72 supported on the top side on the sickle bar 48. The threaded nut 90 arranged on the pin 52 must fix only the U-profile 78 and the plate 76 axially on the pin, in order to guarantee rotation of the pin. The forces acting on the threaded nut 90 and thus also a corresponding tightening torque are here negligibly low, so that the pin 52 can be loosened or removed without a special tool and without significant expenditure of force. The arrangement or installation of the pin 52 described above is shown in detail in FIGS. 3-6.

Figure 7:
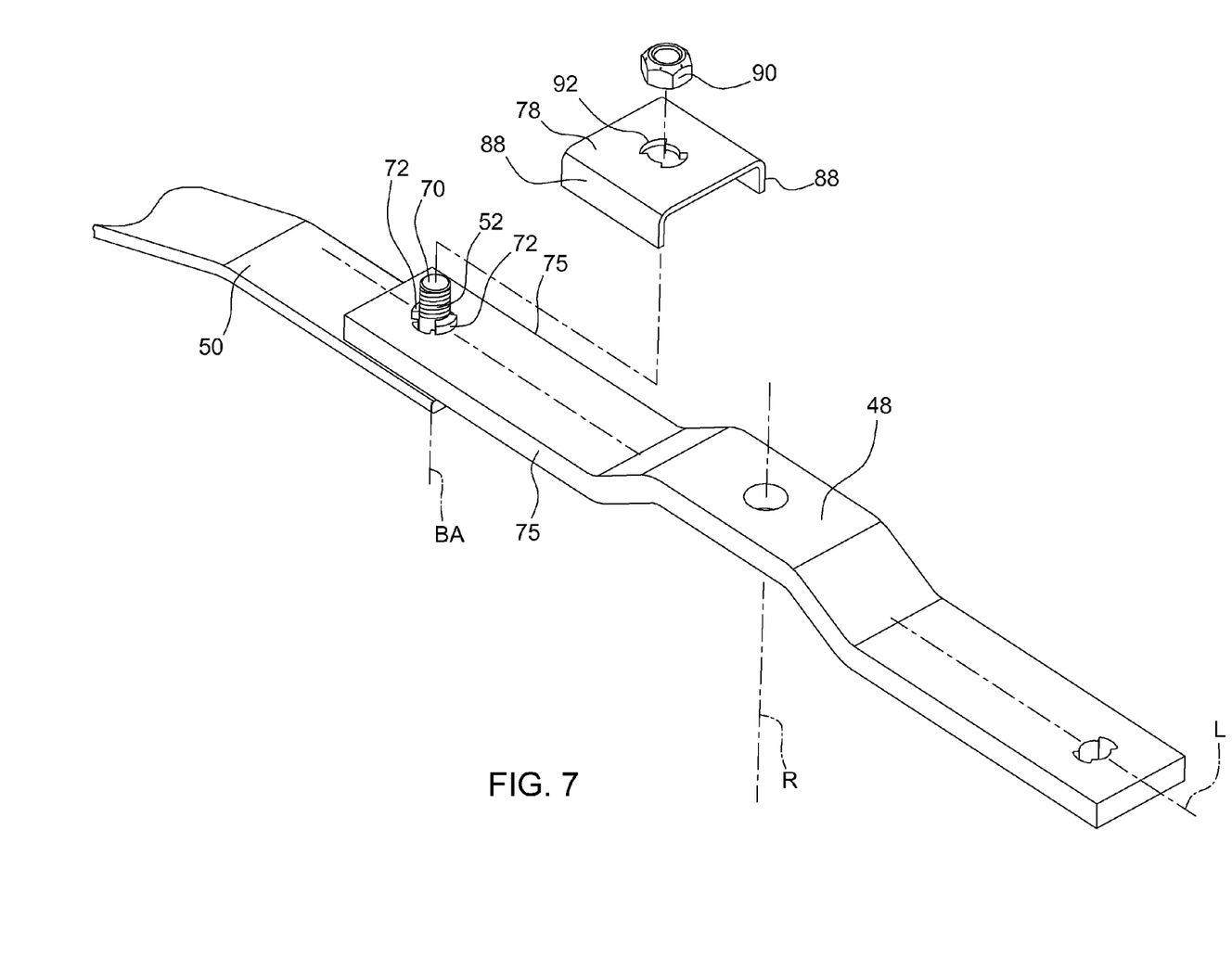
Figure 8:
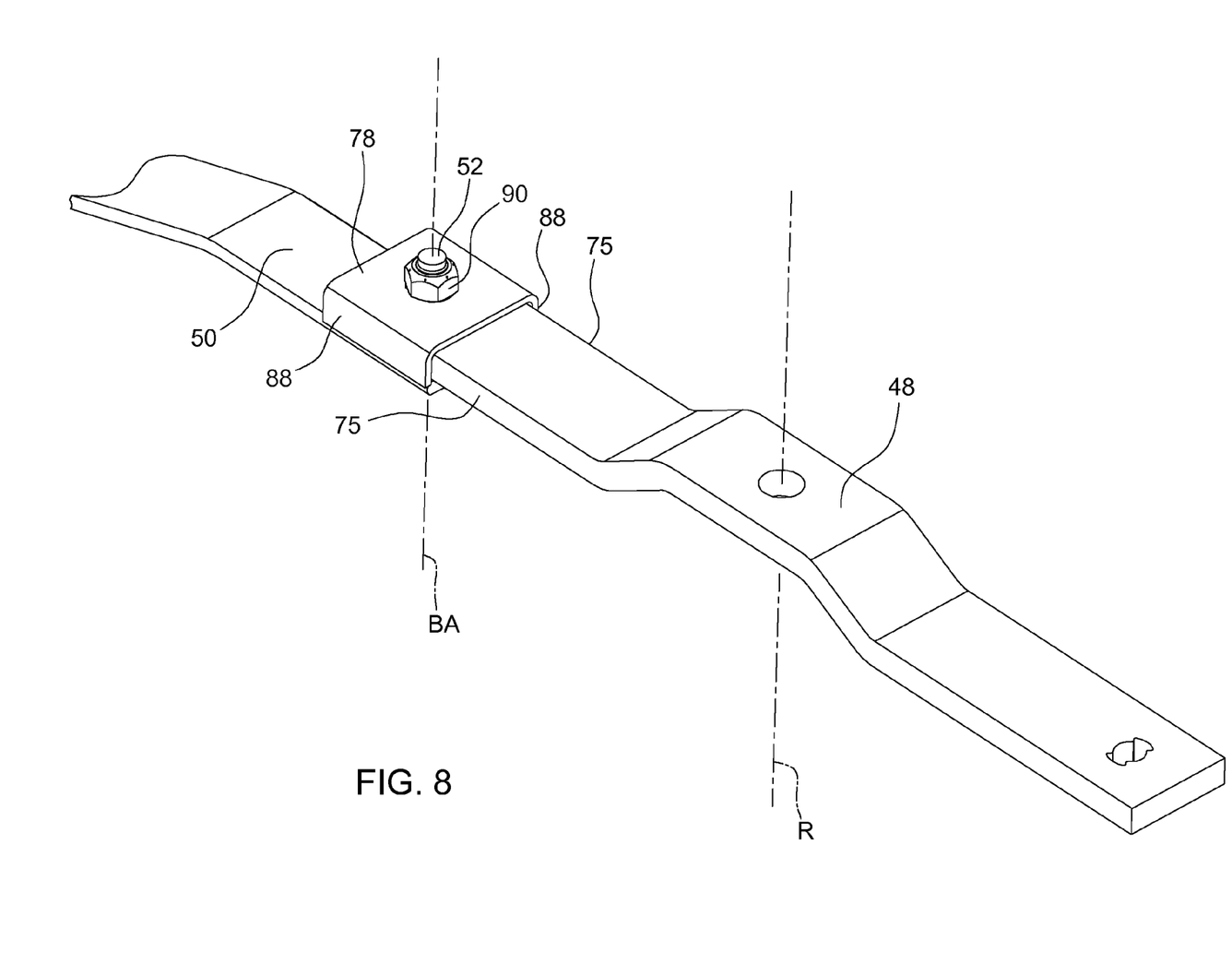

In an alternative embodiment according to FIGS. 7 and 8, for the anti-rotation device, the plate 76 is eliminated, wherein the plate opening 80 there is then formed as a U-profile opening 92 on the top side of the U-profile 78 with the same shape and alignment, and replaces the cylindrical hole 86. The U-profile 78 is here placed directly on the sickle bar 48, in order to secure the pin 52 in its axially fixed position against rotation. The side legs 88 of the U-profile 78 are here somewhat shorter, because the plate 76 is eliminated and only the areas of the sides 75 on the sickle bar 48 must be partially enclosed. The anti-rotation device is thus provided directly and only by the U-profile 78 that, on one hand, surrounds the pin 52 with a positive fit with its U-profile opening 92 in its axially fixed position on its raised sections 72 and, on the other hand, is supported on the sides 75 of the sickle bar 48 with its side legs 88. The rest of this embodiment corresponds to the embodiment from FIGS. 3-6. For production-specific reasons, this embodiment could be disadvantageous, because the non-cylindrical opening 92 in which the U-profile must be inserted must be formed, e.g., by stamping, which could mean a more complicated and expensive process than for a flat component.

Even if the invention has been described merely with reference to one embodiment, in light of the description above and also the drawing, someone skilled in the art could envision many other kinds of alternatives, modifications, and variants that would also fall under the present invention. For example, the alignment of the openings 74, 80 or 74, 92 could have any other orientation, for example, could each be offset by 90°. Other shapes for the raised sections 72 and other corresponding shapes for the openings 74, 80, 92 are also possible. The significant factor is that the pin 52 can be guided by its shaped raised sections 72 only in a certain position or rotated position through the opening 74, it is fixed in the axial direction by a changed position or rotated position in which the raised sections 72 are supported on the edge of the opening 74 on the top side of the sickle bar 48, and is held in this axially fixed position with an anti-rotation device. Furthermore, it would also be conceivable to create an anti-rotation device to fasten the plate 76 directly on the sickle bar 48, for example, to screw it on, and not to provide a U-profile 78 fastened axially on the pin 52. The same also applies for the U-profile 78 that is likewise fastened on the sickle bar 48 instead of on the pin 52, for example, could be screwed onto this piece.

The invention claimed is:

1. A reaping machine comprising:
   a rotatable sickle bar;
   a reaping blade pivotally mounted to the sickle bar;
   a pin having a fastening section fastened to the sickle bar and a holding section separated from the fastening section by a shoulder for holding the reaping blade so that it is pivotal with respect to the sickle bar, the pin having a key; and
   an anti-rotation device having a keyway formed in a shape essentially corresponding to a cross section of the key and having a surface configured to engage the sickle to prevent relative rotation of the anti-rotation device with respect to the sickle bar;
   wherein the pin is rotatably fixed by engagement of the key in the keyway and engagement of the anti-rotation device with the sickle bar.

2. The reaping machine of claim 1, wherein the anti-rotation device includes a plate having the keyway.

3. The reaping machine of claim 2, wherein the anti-rotation device further includes a fixing element having a U-profile with legs extending alongside edges of the sickle bar and the plate to secure the plate, and thereby the pin, against rotation.

4. The reaping machine of claim 1, wherein the anti-rotation device includes a fixing element having the keyway and a U-profile with legs extending alongside edges of the sickle bar to secure the pin against rotation.

5. The reaping machine of claim 1, further including a threaded nut; and
   wherein the fastening section of the pin includes threads to mate with the threaded nut to mount the anti-rotation device to the sickle bar.

6. The reaping machine of claim 1, wherein there are multiple blades pivotally mounted to the sickle bar.

7. The reaping machine of claim 1, wherein key is a radial projection extending radially outward from a cylindrical body of the pin.

8. The reaping machine of claim 7, wherein the key includes multiple spaced circumferentially apart radial projections extending radially out from the cylindrical body of the pin.

* * * * *